United States Patent [19]
Yamakaji

[11] Patent Number: 5,921,343
[45] Date of Patent: Jul. 13, 1999

[54] POWER STEERING STRUCTURE FOR A RUNNING VEHICLE

[75] Inventor: Naoki Yamakaji, Amagasaki, Japan

[73] Assignee: Kanzaki Kokyukoki Mfg. Co., Ltd., Hyogo-ken, Japan

[21] Appl. No.: 08/821,417

[22] Filed: Mar. 21, 1997

[30] Foreign Application Priority Data

Jun. 19, 1996 [JP] Japan ................................. 8-158342

[51] Int. Cl.$^6$ ........................................................ B62D 5/06
[52] U.S. Cl. .......................................... 180/436; 180/253
[58] Field of Search .................................. 180/434, 436, 180/437, 439, 252, 253, 254, 256; 280/98, 103

[56] References Cited

U.S. PATENT DOCUMENTS 2,899,006  8/1959  Brown et al. ............................ 180/436
3,227,237  1/1966  Moreno et al. .......................... 180/436

FOREIGN PATENT DOCUMENTS 1-37337  11/1989  Japan .

*Primary Examiner*—Kevin Hurley
*Attorney, Agent, or Firm*—Sterne, Kessler, Goldstein & Fox P.L.L.C.

[57] ABSTRACT

A power steering structure, in which a power cylinder 10 is disposed at an axle casing of the steering side of a running vehicle, the power cylinder is disposed to traverse above an input shaft 21 for the axle casing, one of the fixed side and movable side of the power cylinder is pivotally mounted on a lid mounted to the axle casing and for supporting the input shaft, and the other is pivotally mounted to one of knuckle arms 23 connected with each other through a tie rod 24.

3 Claims, 4 Drawing Sheets

POWER STEERING STRUCTURE FOR A RUNNING VEHICLE

FIELD OF THE INVENTION

The present invention relates to a power steering structure, in which at least either of front or rear driving wheels of a running vehicle is used as steering wheels so that the steering wheels are rotated by extension and contraction of a power cylinder so as to steer the vehicle.

BACKGROUND OF THE INVENTION

Related Art

Conventionally, the running vehicle, when intended to reduce a steering force, is equipped with a power steering system. The power steering system supplies oil to a power cylinder correspondingly to a rotation of handle so as to extend or contract a movable side of the power cylinder to allow the steering wheels to laterally turn. It is well-known that in a case where the front wheels can be driven to be used as the steering wheels, the power cylinder is provided over the front axle casing and a tie rod is laterally turned through an arm, or the power cylinder is laterally disposed and extends in parallel to the axle casing so as to connect one of the movable side or the fixed side of the power cylinder to the axle casing and the other to the knuckle arm for extending or contracting the power cylinder, thereby enabling the vehicle to be steered. The power cylinder, when laterally disposed, can also be disposed in front or rear of the front axle casing, and, when protected from an obstacle in front, is disposed at the rear of the same, which structure is disclosed in, for example, the Japanese Utility Model Publication No. Hei 1-37337.

As the above-mentioned, where the power cylinder is disposed laterally of the front axle casing and at the rear side thereof, the power cylinder does not traverse the lateral center of the vehicle body, but is disposed not to interfere with a transmission shaft or an input shaft for transmitting power to the front axle casing so as not to be vertically high. However, when a pivotally supporting portion at the fixed side of the power steering cylinder is disposed outwardly (at the side of the knuckle arm) from the laterally center of the front axle casing, the stroke of the power cylinder cannot be made larger, whereby the power cylinder must be reduced in length in itself and the pivotally supporting portion or the power cylinder is reduced in distance from the center of rotation of the knuckle arm so that the tie rod is set in the position where the rod is movable in a specified range in the short stroke. Hence, the power cylinder should be made larger in capacity so as to enlarge the steering force of the front wheels. Hence, the pivotally supporting portions of the power cylinder with the knuckle arms and axle casing are increased in strength and also the axle casing is strengthened in itself. Accordingly, the power cylinder should be of high performance and the axle casing and pivotally supporting portions are larger in thickness to cause weight increment, resulting in a high manufacturing cost.

SUMMARY OF THE INVENTION

An object of the present invention is to provide a power steering structure which uses a power cylinder inexpensive in quantity production so as to expect a lower manufacturing cost, and which disposes the power cylinder at a lateral center of the axle casing of the vehicle body and across over the input shaft so as not to hit an obstacle while the vehicle is running, whereby the power cylinder can be protected and be simple in mounting structure.

In order to attain the above-mentioned objects, driving wheels 11 are supported onto both ends of an axle casing 15 at the steering side in front or rear of the running vehicle in relation of being desirably steerable, so that an input shaft 21 for transmitting power to the deriving wheels is supported at a longitudinally intermediate portion of the axle casing 15 so as to project longitudinally intermediate portion of the axle casing 15 so as to project longitudinally of the vehicle body, and a power cylinder 10 is disposed longitudinally of the axle casing for elongating the stroke of power cylinder, and the power cylinder 10 extends across over the input shaft and is pivotally supported at one of the fixed side or the movable side to the axle casing 15, and the other side to one of the knuckle arms 32 which are provided at driving wheels and connected with each other by a tie rod 24. In this case, the one pivotally supporting portion for the power cylinder 10 is preferable to be provided on a lid 20 fixed to the axle casing so as to support the input shaft, which is advantageous in that the axle casing is simple in construction.

These and other objects and advantages of the invention may be readily ascertained by referring to the following description and drawings.

DESCRIPTION OF THE PREFERRED EMBODIMENT OF THE INVENTION

Figure 1:
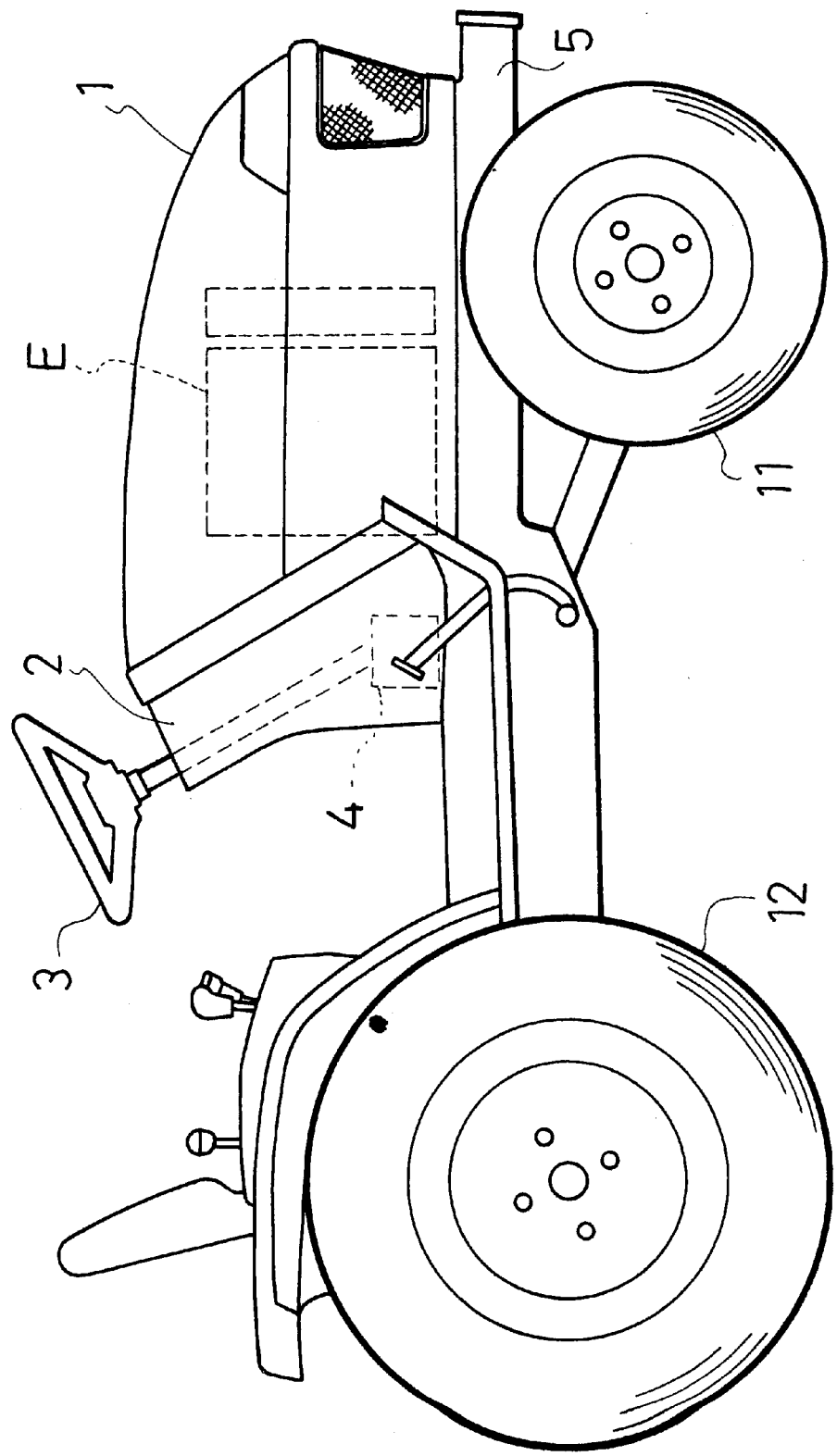
FIG. 1 is an entire side view of a running vehicle of a 4-wheel drive type.

Explanation will be given on an entire structure of a running vehicle of 4 wheel drive type for applying thereon a power steering structure of the present invention in accordance with FIG. 1, in which an engine E is housed in a bonnet 1 on the front of the vehicle body, the engine E is supported thereto by a front frame 5, and power of the engine E is transmitted into a transmission casing to enable front wheels 11, rear wheels 12 and a power take-off shaft to be driven. A dashboard 2 is disposed at the rear of the bonnet 1 and a handle 3 is disposed on the same. A directional control valve 4 is connected to the end of a rotary shaft of the handle 3 so as to be switched by the rotation of handle 3, and a power cylinder 10 to be discussed below and a hydraulic pump are connected with the directional control valve 4 through a piping 5 so that the power cylinder can extend or contract correspondingly to the rotation of handle 3.

Figure 3:
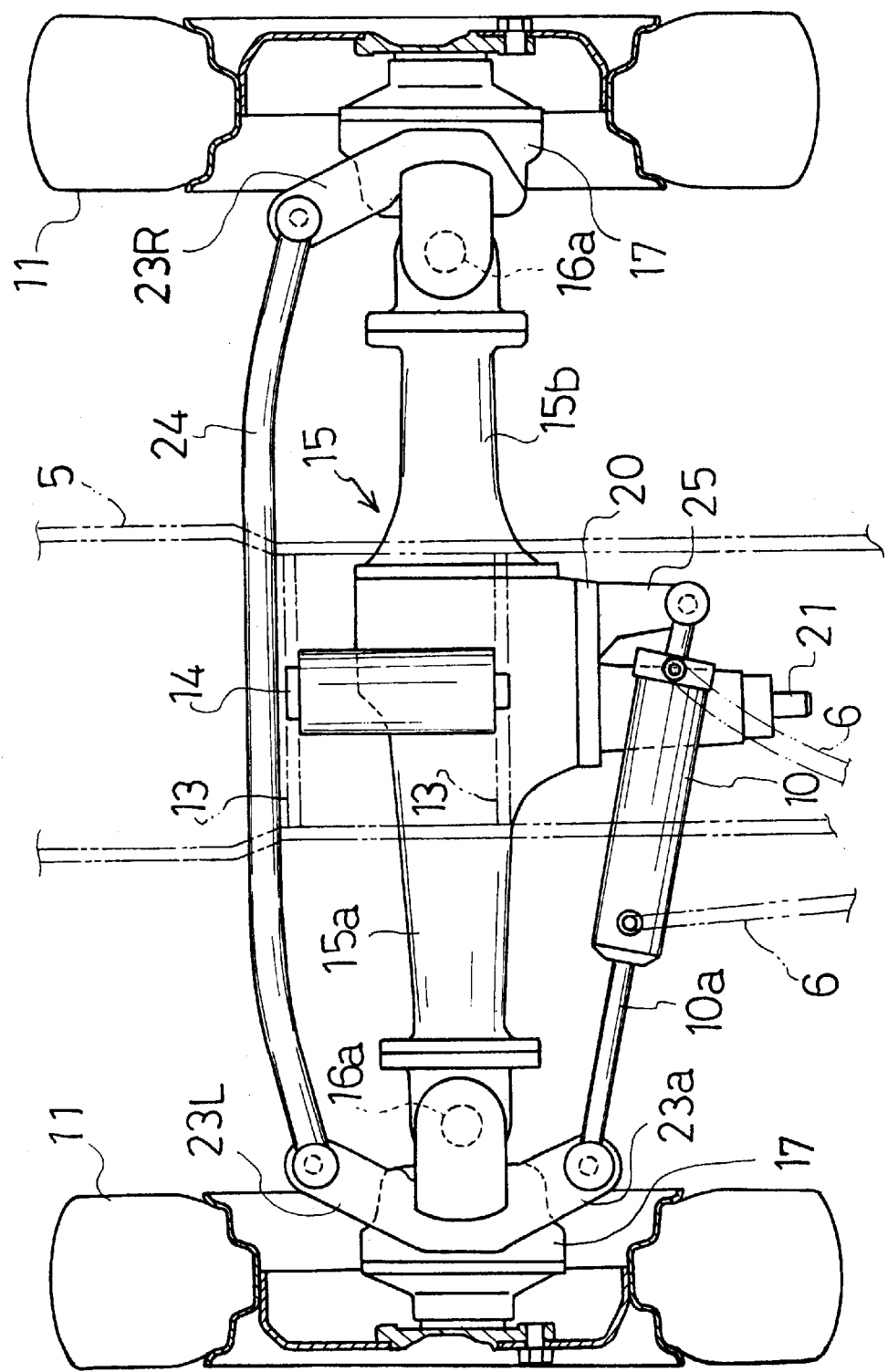
FIG. 3 is a plan view of the same.
Figure 4:
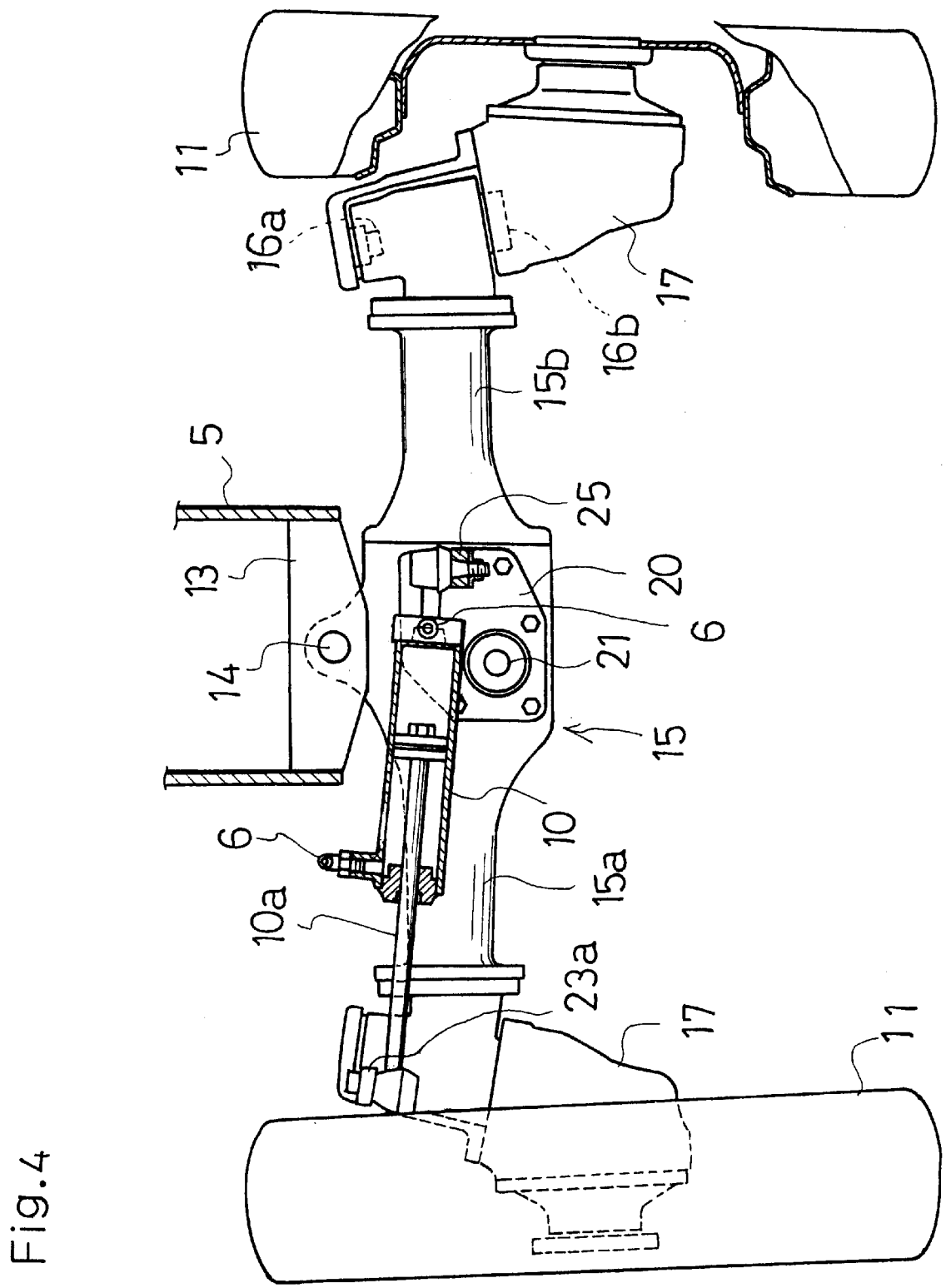
FIG. 4 is a partially sectional rear view of the same.

Next, explanation will be given on a structure of the power cylinder 10 of the principal portion of the present invention with reference to FIGS. 2, 3 and 4. A pair of front and rear support plates 13 are laterally mounted on the front lower portion of the front frame 5, an about intermediately upper portion of the front axle casing 15 extending laterally of the vehicle body is supported on the support plates 13 through a center pin 14, and both the ends of the front axle casing 15 are made vertically swingable. The front axle 15 comprises a first casing 15a containing therein a differential gear unit and one of transmission shafts 10 projects in relation of being transmittable of power therefrom and a second casing 15b containing therein the other of the transmission shaft 19, the first and second casings 15a and 15b being jointed with each other.

An opening is provided on the rear surface of the first casing 15a of the front axle casing 15 provided at the lateral center of the vehicle body, the opening being closed by a lid 20 detachably mounted onto the front axle casing 15. At the lower portion of the lid 20 is pivotally supported an input shaft 21 extending longitudinally of the vehicle body, and the input shaft 21 interlocks at the rear portion thereof through a universal joint and a transmission shaft 22 with a front wheel driving shaft (not shown) projecting from the transmission casing. The input shaft 21 enters at the front thereof into the first casing 15a so as to transmit the power to a ring gear in the differential gear unit through a pinion. The front axle casing 15 supports at both ends thereof rotary casings 17 laterally rotatable around upper king pins 16a and lower king pins 16b, and the front wheels 11 are pivotally supported to the rotary casings 17 respectively, so that the power is transmitted to the front wheels 11 from the other ends of the transmission shafts 19 through a bevel gear and the transmission shafts 19 contained in the front axle casing 15.

At the upper portion of the left and right rotary casings 17 are integrally formed knuckle arms 23L and 23R which forwardly project from the vehicle body and pivotally connect with both ends of the tie rod 24 which extends parallel to and along the front axle casing 15 so that the left and right front wheels 11 can rotate simultateously in the same directions. The knuckle arm 23L at one side integrally forms an arm 23a extending rearwardly of the vehicle body, a support stay 25 is integrally formed at the upper portion of the rear surface of the lid 20 to project rearwardly of the vehicle body, and between the support stay 25 and the arm 23a is pivotally connected the double acting power cylinder 10 of hydraulic operation.

Figure 2:
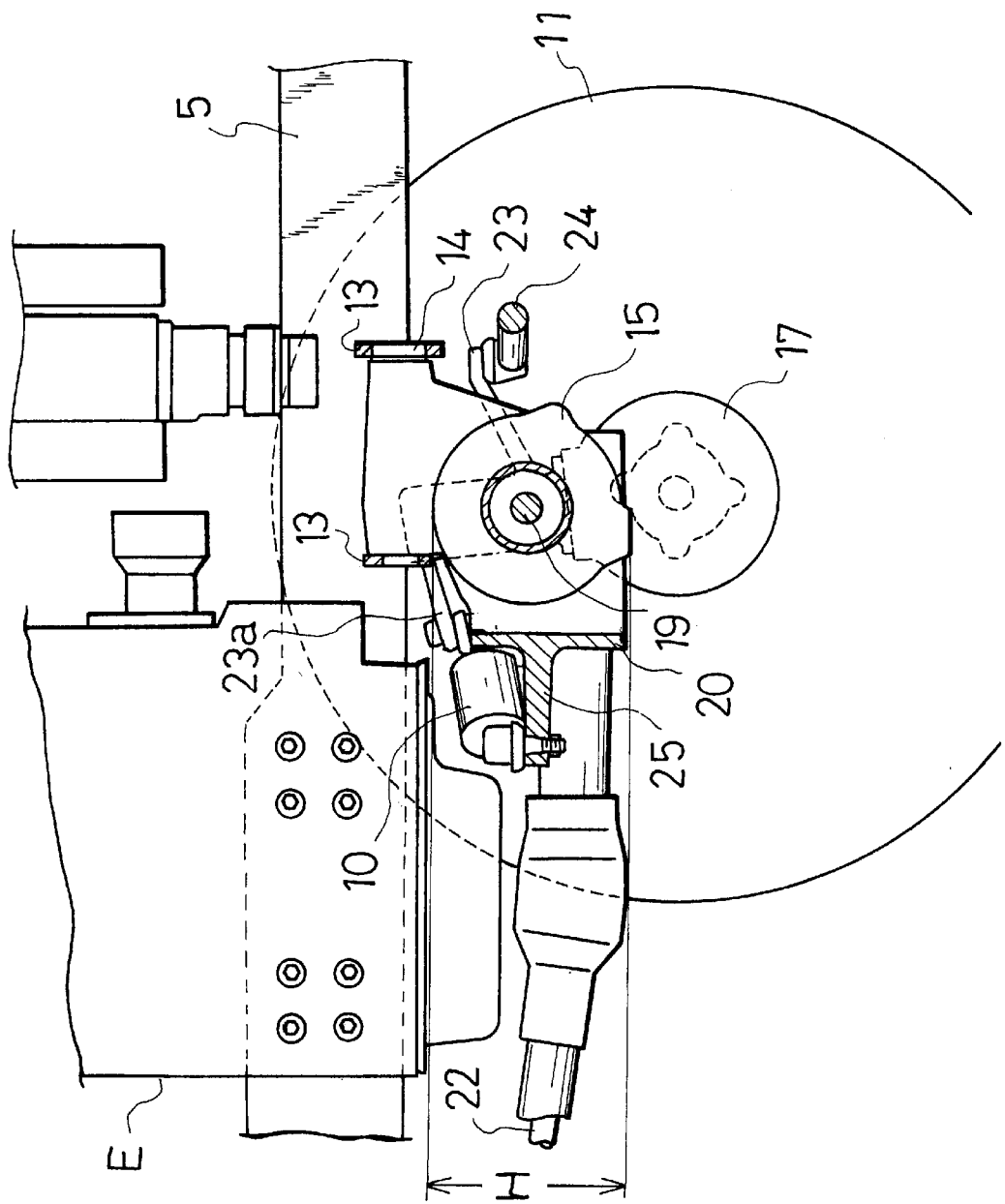
FIG. 2 is a partially sectional side view of a front axle casing, showing a mounting portion for a power cylinder.

In detail, the power cylinder 10 is pivotally mounted at the fixed side thereof onto the utmost end of the support stay 25 through a swivel joint so as to form a first pivotally mounting portion, which is set to enter into a range of vertical height H of the front axle casing 15 as shown in FIG. 2. The utmost end of a piston rod 10a at the movable side of the power cylinder 10 is pivotally mounted onto the utmost end of the arm 23a through a swivel joint so as to form a second pivotally mounting portion. Hence, the power cylinder 10 is laterally disposed behind the front axle casing 15 and longitudinally thereof so as to traverse above the input shaft 21. In addition, conversely to the embodiment, the power cylinder 10 may be pivotally mounted at the piston rod 10a to the support stay 25 and at the fixed side to the arm 23a.

In this structure, both the pivotally mounting portions of the power steering cylinder 10 are positioned across over the input shaft 21 disposed at the lateral center of the vehicle body, whereby a distance between the pivotally mounting portions at the fixed side and movable side can be made larger than the conventional, and the stroke of the power cylinder 10 can be longer to make the knuckle arm 23 longer. Hence, materials of the members for this structure and of the support members need not be increased in strength, and also, when one pivotally mounting portion is formed at the lid 20 detachably mounted to the front axle casing 15, only the lid 20, to which a load concentrates on, is enough to be of strength in comparison with the case that the power cylinder is directly mounted to the front axle casing 15. Whereby the front axle casing 15 can be molded as a whole with a soft metallic material, such as aluminum, and the total weight can be reduced.

When the operator rotates the handle 3, the directional control valve 4 at the base of handle 3 is switched and the pressurized oil is sent from the hydraulic pump to an oil chamber at the extension side or the contraction side of the power cylinder 10, so that the piston rod 10a extends or contracts, whereby the arm 23a of the knuckle arm 23L rotates around the king pin 16 so as to laterally swivel the front wheels to enable the vehicle body to be steered. The power cylinder 10, which is positioned rearwardly of the front casing 15 and above the input shaft 21, is protected from an obstacle on the ground while running.

The present invention constructed as the above-mentioned can attain the following effect: Since the power cylinder is disposed in a manner of traversing above the input shaft at the front axle casing, the stroke of the power cylinder can be made longer, so that it is not necessary to improve the performance of power cylinder or increase the strength of the pivotally mounting portions and axle casing, thereby enabling a manufacturing cost to be reduced. Also, the power cylinder is pivotally mounted to the lid for supporting the input shaft, thereby enabling the front axle casing to be simple in construction.

While an embodiment of the invention has been shown and described, the invention is not limited to the specific construction thereof, which is merely exemplary in the specification rather than is defined.

What is claimed is:

1. A power steering structure for a vehicle, comprising:

an axle casing;

a pair of steerable driving wheels supported on both longitudinal ends of said axle casing;

a pair of knuckle arms provided at said steerable driving wheels and pivotally connected to each other through a tie rod;

an input shaft extending outward from said axle casing, said input shaft transmitting power from an engine of the vehicle to said steerable driving wheels;

a power cylinder having a fixed end and a movable end wherein one of said fixed end and said movable end is pivotally mounted to a side of said axle casing traversing above said input shaft longitudinally of said axle casing and the other of said ends is pivotally mounted to one of said knuckle arms.

2. A power steering structure for a running vehicle as set forth in claim 1, characterized in that said input shaft extends outward from said axle casing perpendicular to the longitudinal direction of said axle casing.

3. A power steering structure for a running vehicle as set forth in claim 1, characterized in that a lid for supporting said input shaft is mounted onto said axle casing, so that one of said pivotally mounting portions for mounting said power cylinder is formed on said lid.

* * * * *